US012686811B2

(12) United States Patent
Li et al.

(10) Patent No.: US 12,686,811 B2
(45) Date of Patent: Jul. 21, 2026

(54) AQUEOUS BASED, WATER-SOLUBLE POLYMER SLURRY SYSTEM

(71) Applicant: Terra-Ace Intermediate Holdings, LLC, Odessa, TX (US)

(72) Inventors: Jia Li, Odessa, TX (US); Jeffrey M. Louis, Montgomery, TX (US)

(73) Assignee: Terra-Ace Intermediate Holdings, LLC, Odessa, TX (US)

( * ) Notice: Subject to any disclaimer, the term of this patent is extended or adjusted under 35 U.S.C. 154(b) by 179 days.

(21) Appl. No.: 18/375,328

(22) Filed: Sep. 29, 2023

(65) Prior Publication Data

US 2024/0117243 A1 Apr. 11, 2024

Related U.S. Application Data

(60) Provisional application No. 63/414,239, filed on Oct. 7, 2022.

(51) Int. Cl.
C09K 8/88 (2006.01)
C09K 8/84 (2006.01)

(52) U.S. Cl.
CPC ............. C09K 8/882 (2013.01); C09K 8/845 (2013.01)

(58) Field of Classification Search
None
See application file for complete search history.

(56) References Cited

U.S. PATENT DOCUMENTS

| | | | |
|---|---|---|---|
| 2012/0316090 A1 | 12/2012 | Chang et al. | |
| 2016/0369153 A1* | 12/2016 | Ali | C08K 3/346 |
| 2019/0241796 A1* | 8/2019 | Mast | C09K 8/905 |
| 2021/0079169 A1 | 3/2021 | Omont et al. | |

FOREIGN PATENT DOCUMENTS

| | | |
|---|---|---|
| GB | 2574494 A | 12/2019 |
| JP | 2015088473 A | 5/2015 |
| WO | 1997026310 A1 | 7/1997 |
| WO | 2003085232 A1 | 10/2003 |

OTHER PUBLICATIONS

International Search Report mailed in PCT Application No. PCT/US23/34294 on Feb. 24, 2024.

* cited by examiner

*Primary Examiner* — Jeffrey D Washville
(74) *Attorney, Agent, or Firm* — Troutman Pepper Locke LLP; Mark R. Backofen

(57) ABSTRACT

Systems and methods for forming aqueous based, water-soluble polymer slurry systems may include (1) a liquid phase which may be a suspension comprised of salt, water, and a water-soluble organic solvent and (2) a solid phase which may comprise a water-soluble polymer powder. The aqueous based, water-soluble polymer slurry systems may optimize processing of the suspension package so that it may slurry in low and high salt tolerance polymers, and the finished product can survive over 30 days at an approximately 120-degree Fahrenheit aging temperature, thereby overcoming economic performance and stability challenges through its high flash point, long shelf-life, high-temperature tolerance, and low cost.

20 Claims, No Drawings

AQUEOUS BASED, WATER-SOLUBLE POLYMER SLURRY SYSTEM

CROSS-REFERENCE TO RELATED APPLICATIONS

This application claims priority to and the benefit of U.S. Provisional Application No. 63/414,239, filed Oct. 7, 2022, the entire contents of which are herein incorporated by reference in their entirety.

FIELD OF THE DISCLOSURE

This disclosure relates to polymer slurry systems, and more particularly, aqueous based, water-soluble polymer slurry systems to prevent water-soluble polymers from hydrating in an aqueous suspension fluid.

BACKGROUND

Water-soluble polymer powders are widely used in many industries to control water rheology properties. One of the significant applications of the water-soluble polymer in the oil and gas industry is acting as the friction reducer in hydraulic fracturing operations. First, the polymer and other additives are mixed with water in the blender to create fracking fluid. Then, fracking pumps pressure the fluid and deliver energy and sand to the downhole to frack the reservoir.

It is not practical to add water-soluble polymers by using concentrated aqueous solutions of the polymer. Since the water-soluble polymers are used to affect the rheology of water-based fluids, concentrated solutions would be highly viscous and extremely difficult to pump and otherwise handle. Solutions with a low enough concentration of the water-soluble polymer would not have a large effect on the viscosity of the water-based fluid being treated and thus would require large amounts of treating fluid. As a result, for industrial application, the dry polymer powder may be used directly with a dispersion unit, or the polymer powders may be slurred into an oil-based suspension fluid. An oil-based polymer slurry, a liquid product, owns the conveniences of handling/operation compared with dry powder with a particular dispersion unit, and yields better cost structure especially when the mineral oil prices are low. As the price of mineral oil/crude-oil based oil goes up, the negative economic performance of an oil-based polymer slurry can outweigh operational benefits. That causes the industry to shift back to dry polymer with dispensing units from a cost control perspective.

More recently, attempts have been made to develop aqueous based suspensions of the water soluble polymers. These may use calcium chloride solution as a base mixed with additives including a low molecular weight polymer and alcohol. The calcium chloride reduces the solubility of the water soluble polymer in the water. However, this method has significant weakness and operating limitations due to the low flash point, short shelf-life, and destabilization. It can also still result in a significant amount of the water-soluble polymer being hydrated, which negatively affects the viscosity and thus processability of the suspension. Thus, there is still a need for an improved aqueous-based polymer slurry, especially one that has a long stable shelf-life.

SUMMARY

Embodiments of the present disclosure may provide systems and methods for forming aqueous based, water-soluble polymer slurry systems comprising: a liquid phase comprising water, one or more salts, and a water-soluble organic solvent or a mixture of water-soluble organic solvents; and a solid phase comprising a water-soluble polymer powder or a mixture of polymer powders, wherein the liquid phase may provide a sufficient suspension and significantly prevent the solid phase from hydrating into solution. Preferably, the salts are present in the liquid phase in an amount that is higher than its maximum solubility in water. Preferably, the aqueous based, water-soluble polymer slurry system may comprise 10-55% water-soluble polymers by weight, 10-53% water by weight, 10-44.5% salts by weight, and 1-85% water-soluble organic solvents by weight. Preferably, the polymer slurry system may survive over 30 days at an approximately 120-degree Fahrenheit aging temperature.

DETAILED DESCRIPTION

The present invention can be better understood by the following discussion of the manufacture and use of certain preferred embodiments. Each feature from one aspect or embodiment of the invention may be employed in each other aspect of the invention. Numerical ranges stated in the format "from x to y" include the mentioned values as well as the values within the range of the respective measuring error as known to the skilled person. If several preferred numerical ranges are stated in such format, then of course all ranges formed by combining the different end points are also included. Unless otherwise stated, commercial or technical grades (as opposed to laboratory grade) of the various materials were used in the preferred embodiments. The use of the term "about" is intended to encompass all values that lie within the range of the respective measurement accuracy known to the skilled person. The term "substantially free" is intended to connote that the particular material is not detected (i.e. is below the detection limit) using standard commercial tests and methodologies used in the industry as of the earliest priority date of this application or otherwise is only detected in trace amounts such as might be caused by contaminants in the particular grade of materials used or arising from the manufacturing process. The phrase "substantially prevent the solid phase from hydrating into solution" means that there is not enough of the water soluble polymer in solution to result in greater than 40% increase in the viscosity of the slurry system after a period of thirty days at 120° F. More preferably, there is less than a 20% increase in viscosity and most preferably there is less than a 10% increase in viscosity after a period of thirty days at 120° F.

Embodiments of the present disclosure may provide systems and methods for forming aqueous based, water-soluble polymer slurry systems comprising: a liquid phase comprising water, one or more salts, and a water-soluble organic solvent or a mixture of water-soluble organic solvents; and a solid phase comprising a water-soluble polymer powder or a mixture of powders, wherein the liquid phase may provide a sufficient suspension and significantly prevent the solid phase from hydrating into solution. Preferably, the salts are present in the liquid phase in an amount that is higher than its maximum solubility in water. Preferably, the aqueous based, water-soluble polymer slurry system may comprise 10-55% water-soluble polymers by weight, 10-53% water by weight, 10-44.5% salts by weight, and 1-85% water-soluble organic solvents by weight. In another embodiment of the present disclosure, the polymer slurry system may include 10-50% water-soluble polymer powder, 10-60% water by weight, 20-50% salt by weight, and 5-50% water-soluble organic solvent by weight.

The solid phase of the slurry system according to embodiments of the present disclosure may comprise a water-soluble polymer powder or a mixture of water-soluble polymer powders. The water-soluble polymer powder preferably provides a rheological additive that may dissolve in water or brine and change the rheological properties of the resultant system. Preferred water-soluble polymer powders include, but are not limited to, polyacrylamide, xanthan gum, and guar gum. Preferably, the water-soluble polymer is present in the polymer slurry system in an amount of from 10-55% water-soluble polymers by weight and 10-53% water by weight, based on the weight of the polymer slurry system. Once the polymer content is above the preferred range, the slurry may become too thick and not pumpable. If the polymer content falls below the preferred range, the slurry will not likely be economically viable as too much of the suspension system would be required to sufficiently modify the rheology of the water-based fluid being treated. If the water content is above the preferred range, it becomes too difficult to get enough of the other components to prevent the hydration of the polymer and the slurry may become too thick and not pumpable. If the water content is too low, it will not be economical as there will be higher amounts of the more expensive organic solvent.

The liquid phase of the slurry system according to embodiments of the present disclosure is preferably comprised of one or more salts, water, and a water-soluble organic solvent or a mixture of water-soluble organic solvents. The liquid phase helps to minimize or prevent the water-soluble polymers from hydrating into solution. The liquid phase may further optimize processing of the suspension package so that the finished product can survive over 30 days at an approximately 120-degree Fahrenheit aging temperature, thereby overcoming economic performance and stability challenges through its high flash point, long shelf-life, high-temperature tolerance, and low cost. Preferably, the liquid phase of the slurry system according to embodiments of the present disclosure may be a suspension comprised of salt such as calcium chloride or magnesium chloride, water, and a water-soluble organic solvent or a mixture of water-soluble organic solvents, such as triethylene glycol, 2-butoxyethanol, ethylene glycol, or glycerol.

Preferred water-soluble organic solvents used in the liquid phase include triethylene glycol, 1,4-butanediol, 1,3-butanediol, 1,2-butanediol, 2-butoxyethanol, dimethoxyethane, furfuryl alcohol, methyl diethanolamine, 1,5-pentanediol, propylene glycol, glycerin, glycerol, ethylene glycol and glycol ether.

Preferably, the water-soluble organic solvent is present in an amount of from about 1 to about 85% by weight of the slurry system. The water-soluble organic solvent, along with the inorganic salt, is a critical component in inhibiting polymer hydration and maintaining the stable status of the slurry. Therefore, keeping it in the designed ranges may help slurry avoid separation and consolidation.

The liquid phase preferably includes one or more inorganic salts. Inorganic salt like calcium chloride is a chemical compound consisting of positively charged calcium ions and negatively charged chloride ions. As the salts dissolve in the water, positively charged cations and negatively charged anions are released into the solution. Regardless of the chemistry, as long as the chemical components possess the charged cations in the water solution, it is functionally a salt. Without being bound by theory, it is currently believed that the cation of the salt serves to protect the polymer from being hydrated with free water.

The one or more salts are preferably selected from aluminum chloride, ferric chloride, calcium chloride, magnesium chloride, potassium chloride, sodium chloride, sodium sulfate, ammonium chloride and ammonium sulfate. Particularly preferred are salts with a trivalent cation, such as aluminum or ferric, and most particularly aluminum salts. Using the signal source of cations like calcium chloride or combining trivalent/divalent/monovalent cations in the suspension liquid depends on the polymer type. For example, aluminum and/or ferric cations combined with calcium and/or magnesium perform best for the anionic polyacrylamide.

It is preferred that the one or more inorganic salts constitute from about 10 to about 44.5% by weight of the slurry system. The salt, along with the water-soluble organic solvent, is a critical component in inhibiting polymer hydration and maintaining the stable status of the slurry. Therefore, keeping them in the designed ranges may help slurry avoid separation and consolidation. It is also important for the amount of the inorganic salts to be higher than its solubility of saturation in water.

A preferred method of forming the aqueous based, water-soluble polymer slurry system is discussed in this embodiment. First the inorganic salt or mixture of inorganic salts is dissolved in water to form a salt solution at an elevated first temperature. The elevated first temperature may be achieved by heating the water to an elevated first temperature prior to or during the dissolving step. Alternatively, depending upon the inorganic salt selected, the elevated first temperature may be achieved as a result of the dissolving step being exothermic and generating heat that increases the temperature of the water or solution. For example, depending on the salt selected, the dissolving step may release heat to raise the temperature of the salt solution to over about 120° F. The elevated first temperature should be sufficiently high to increase the solubility of the salt. Particularly preferred is selecting an elevated first temperature that results in about a 20% increase in the solubility of the inorganic salt or mixture of salts. The desired elevated first temperature is based on the solubility of the particular salts that are being used. For example, an elevated first temperature of from about 100° F. to about 180° F. is preferred for calcium chloride and Aluminum chloride.

Once the salt(s) has been fully dissolved in the water, the solution is maintained at the elevated temperature while the water-soluble organic solvent or mixture of water-soluble organic solvents is mixed into the salt solution. The mixing is continued until the water-soluble organic solvent or mixture of water-soluble organic solvents is fully dissolved into the salt solution.

Once the water-soluble organic solvent(s) is fully dissolved into the salt solution, the solution can be cooled, either by active cooling or allowing it to cool down to a second lower temperature. Preferably the solution is cooled down to room temperature. As the solution cools, the salt solubility decreases in the water and precipitated salt may immigrate to the water-soluble organic solvent to for a suspension.

Finally, once the liquid phase has been cooled or allowed to cool down, the water-soluble polymer or mixture of water-soluble polymers is added to the liquid phase to form a slurry. In one preferred embodiment, the salt may preferably be a mixture of calcium chloride and aluminum chloride, the water-soluble organic solvent may be glycerin, and the water-soluble polymer may be polyacrylamide powder. In another preferred embodiment, the salt may be ammonium sulfate, ethylene glycol may be the water-soluble organic solvent, and guar powder may be the water-soluble polymer. The heating step may heat water to the first temperature at 100-180° F. depending on the salts.

The invention may be further understood by reference to the following non-limiting examples:

Example 1

In a first example of an embodiment of the invention, to create 100 grams of 30% polyacrylamide polymer slurry, 31.5 grams of calcium chloride may be dissolved into 31.5 grams of water to form a calcium chloride solution. This dissolving process may release heat and raise the temperature to over 120° F. It should be appreciated that this temperature may vary depending on the type of salt that may be used and the high temperature may allow water to dissolve more of the salt before adding the organic solvent. Once the temperature of the calcium chloride solution has been raised to over 120° F. and the salt has been fully dissolved, 7 grams of glycerin may be added to the calcium chloride solution. It should be appreciated that the high temperature also may increase the solubility of salt in the organic solvent. The solution may then be mixed until the glycerin fully dissolves into the calcium chloride solution. In this embodiment, the liquid phase of the polymer slurry system may include calcium chloride as the salt, glycerin as the water-soluble organic solvent, and water. These components form a suspension package of the aqueous based, water polymer slurry system. However, it should be appreciated that other salts and water-soluble organic solvents may be substituted for calcium chloride and glycerin, respectively, in embodiments of the present disclosure.

After the glycerin has been fully dissolved into the calcium chloride solution, the resultant solution may be cooled to 100° F. At that point, 30 grams of polyacrylamide powder may then be added into the resultant solution to form a slurry. The slurry may then be mixed until no polymer clumps are present in the slurry. In this embodiment of the present disclosure, polyacrylamide powder is the water-soluble polymer that comprises about 30% by weight of the aqueous based, water-soluble slurry system by weight, glycerin is the water-soluble organic solvent that comprises about 7% of the slurry system by weight, water comprises about 31.5% of the slurry system by weight, and calcium chloride is the inorganic salt that comprises about 35.5% of the slurry system by weight. However, it should be appreciated that other water-soluble polymers may be used in place of polyacrylamide powder without departing from the present disclosure.

Example 2

In a second example, a different salt, organic solvent and water-soluble polymer from the first example are used to create 100 grams of 50% guar polymer slurry. First, 15 grams of water are heated to 130° F. Then 15 grams of ammonium sulfate can be dissolved in the heated water to form an ammonium sulfate solution. Due to the endothermic reaction of dissolving ammonium sulfate into the water, it should be appreciated that the water may be heated to a range of 100-130° F. in embodiments of the present disclosure. Compared with calcium chloride, ammonium sulfate solubility is less sensitive to the temperature. It should be appreciated that additional heat may need to be applied to maintain the temperature at 130° F. during the dissolving process. Once the ammonium sulfate is fully dissolved, 20 grams of ethylene glycol may then be added into the ammonium sulfate solution while maintaining the solution at a temperature of at least 130° F. However, it should be appreciated that the solution temperature may be in a range of 100-130° F. in embodiments of the present disclosure. Mixing should occur until ethylene glycol fully dissolves into the ammonium sulfate solution (i.e., no salt particles visibly present in the solution).

In this embodiment, the liquid phase of the polymer slurry system may include ammonium sulfate as the salt, ethylene glycol as the water-soluble organic solvent, and water. However, it should be appreciated that other salts and water-soluble organic solvents may be substituted for ammonium sulfate and ethylene glycol, respectively, in embodiments of the present disclosure. Ammonium sulfate, ethylene glycol, and water form a suspension package of the aqueous based, water-soluble polymer slurry system in this embodiment of the present disclosure.

After ethylene glycol has been fully dissolved into the ammonium sulfate solution, the resultant solution may be cooled to 100° F. 50 grams of guar powder may then be added into the resultant solution to form a slurry. The slurry may then be mixed until no polymer clumps may be present in the slurry. Of the present disclosure, guar powder is the water-soluble polymer that may comprise 50% by weight of the aqueous based, water-soluble slurry system, ethylene glycol is the water-soluble organic solvent that comprises about 20% of the slurry system by weight, water comprises about 15% of the slurry system by weight, and ammonium sulfate is the inorganic salt that comprises about 15% of the slurry system by weight. However, it should be appreciated that other water-soluble polymers may be used in place of guar powder without departing from the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An aqueous based, water-soluble polymer slurry system comprising:

a liquid phase comprising water, one or more inorganic salts, and one or more water-soluble organic solvents;

a solid phase comprising a water-soluble polymer powder or polymer mixer, wherein the amount of the one or more inorganic salts in the liquid phase is greater than the one or more inorganic salt's solubility in water; and wherein the liquid phase comprises about 45-90% by weight of the polymer slurry system.

2. The aqueous based, water-soluble polymer slurry system of claim 1, wherein the slurry system comprises about 10-53% water by weight, about 10-44.5% of one or more inorganic salts by weight, and about 1-85% of one or more water-soluble organic solvents by weight.

3. The aqueous based, water-soluble polymer slurry system of claim 1, wherein the solid phase comprises about 10-55% by weight of the polymer slurry system.

4. The aqueous based, water-soluble polymer slurry system of claim 1, wherein the one or more water-soluble organic solvent is selected from the group comprising:

triethylene glycol, 1,4-butanediol, 1,3-butanediol, 1,2-butanediol, 2-butoxyethanol, dimethoxyethane, furfuryl alcohol, methyl diethanolamine, 1,5-pentanediol, propylene glycol, glycerin, ethylene glycol, glycol ethers, and mixtures thereof.

5. The aqueous based, water-soluble polymer slurry system of claim 1, wherein the water-soluble polymer powder is selected from the group comprising:

polyacrylamide, xanthan gum, guar gum, and mixtures thereof.

6. The aqueous based, water-soluble polymer slurry system of claim 1, wherein the one or more inorganic salts is selected from the group comprising:

calcium chloride, magnesium chloride, potassium chloride, sodium chloride, sodium sulfate, ammonium chloride, ammonium sulfate, and mixtures thereof.

7. The aqueous based, water-soluble polymer slurry system of claim 1, wherein the polymer slurry system survives over 30 days at an approximately 120-degree Fahrenheit aging temperature.

8. A method to form an aqueous based, water-soluble polymer slurry system comprising:

dissolving one or more inorganic salts in water to form a salt solution at an elevated temperature that increases the solubility of the one or more inorganic salts;

mixing one or more water-soluble organic solvents into the salt solution at the elevated temperature until the one or more water-soluble organic solvents is fully dissolved into the salt solution;

cooling the salt solution to a second temperature wherein a portion of the one or more inorganic salts are suspended in the salt solution; and adding a water-soluble polymer or polymer mixer to the suspension to form a slurry; and wherein the polymer slurry system survives over 30 days at an approximately 120-degree Fahrenheit aging temperature.

9. The method of claim 8, wherein the one or more inorganic salts is calcium chloride, the one or more water-soluble organic solvents is glycerin, and the water-soluble polymer is polyacrylamide powder.

10. The method of claim 9, wherein the elevated temperature is over 120° F. and the dissolving step releases heat to achieve the elevated temperature.

11. The method of claim 9, further comprising the step of cooling the salt solution to a temperature of about 100° F.

12. An aqueous based, water-soluble polymer slurry system comprising:

a liquid phase comprising water, one or more inorganic salts, and one or more water-soluble organic solvents;

a solid phase comprising a water-soluble polymer powder or polymer mixer, wherein the amount of the one or more inorganic salts in the liquid phase is greater than the one or more inorganic salt's solubility in water; and wherein the aqueous based, water-soluble polymer slurry system of claim 1, wherein the polymer slurry system survives over 30 days at an approximately 120-degree Fahrenheit aging temperature.

13. The aqueous based, water-soluble polymer slurry system of claim 12, wherein the slurry system comprises about 10-53% water by weight, about 10-44.5% of one or more inorganic salts by weight, and about 1-85% of one or more water-soluble organic solvents by weight.

14. The aqueous based, water-soluble polymer slurry system of claim 12, wherein the one or more water-soluble organic solvent is selected from the group comprising:

triethylene glycol, 1,4-butanediol, 1,3-butanediol, 1,2-butanediol, 2-butoxyethanol, dimethoxyethane, furfuryl alcohol, methyl diethanolamine, 1,5-pentanediol, propylene glycol, glycerin, ethylene glycol, glycol ethers, and mixtures thereof.

15. The aqueous based, water-soluble polymer slurry system of claim 12, wherein the water-soluble polymer powder is selected from the group comprising:

polyacrylamide, xanthan gum, guar gum, and mixtures thereof.

16. The aqueous based, water-soluble polymer slurry system of claim 12, wherein the one or more inorganic salts is selected from the group comprising:

calcium chloride, magnesium chloride, potassium chloride, sodium chloride, sodium sulfate, ammonium chloride, ammonium sulfate, and mixtures thereof.

17. An aqueous based, water-soluble polymer slurry system comprising:

a liquid phase comprising water, one or more inorganic salts, and one or more water-soluble organic solvents;

a solid phase comprising a water-soluble polymer powder or polymer mixer, wherein the amount of the one or more inorganic salts in the liquid phase is greater than the one or more inorganic salt's solubility in water; and wherein the slurry system comprises about 10-53% water by weight, about 10-44.5% of one or more inorganic salts by weight, and about 1-85% of one or more water-soluble organic solvents by weight.

18. The aqueous based, water-soluble polymer slurry system of claim 17, wherein the one or more water-soluble organic solvent is selected from the group comprising:

triethylene glycol, 1,4-butanediol, 1,3-butanediol, 1,2-butanediol, 2-butoxyethanol, dimethoxyethane, furfuryl alcohol, methyl diethanolamine, 1,5-pentanediol, propylene glycol, glycerin, ethylene glycol, glycol ethers, and mixtures thereof.

19. The aqueous based, water-soluble polymer slurry system of claim 17, wherein the water-soluble polymer powder is selected from the group comprising:

polyacrylamide, xanthan gum, guar gum, and mixtures thereof.

20. The aqueous based, water-soluble polymer slurry system of claim 17, wherein the one or more inorganic salts is selected from the group comprising:

calcium chloride, magnesium chloride, potassium chloride, sodium chloride, sodium sulfate, ammonium chloride, ammonium sulfate, and mixtures thereof.

* * * * *